(12) United States Patent
Starkey, II et al.

(10) Patent No.: US 7,906,463 B2
(45) Date of Patent: *Mar. 15, 2011

(54) BIOCIDE FOR WELL STIMULATION AND TREATMENT FLUIDS

(75) Inventors: Ronald Joe Starkey, II, Canton, GA (US); Geoffrey Allen Monteith, Midland, GA (US); Carl Wilhelm Aften, Fortson, GA (US)

(73) Assignee: Kemira Chemicals Inc., Kennesaw, GA (US)

( * ) Notice: Subject to any disclaimer, the term of this patent is extended or adjusted under 35 U.S.C. 154(b) by 346 days.

This patent is subject to a terminal disclaimer.

(21) Appl. No.: 11/497,724

(22) Filed: Aug. 2, 2006

(65) Prior Publication Data

US 2008/0032903 A1    Feb. 7, 2008

(51) Int. Cl.
*C09K 8/68* (2006.01)
*C09K 8/60* (2006.01)
*C09K 8/588* (2006.01)
*C09K 8/528* (2006.01)
*C09K 8/584* (2006.01)
*E21B 43/00* (2006.01)

(52) U.S. Cl. ......... 507/211; 507/201; 507/209; 507/213; 507/221; 507/224; 507/252; 507/256; 507/920

(58) Field of Classification Search .................. 507/201, 507/209, 213, 221, 224, 252, 256, 920, 211
See application file for complete search history.

(56) References Cited

U.S. PATENT DOCUMENTS

| 3,067,095 | A |  | 12/1962 | Baltazzi ........................... 167/33 |
| 3,377,275 | A |  | 4/1968 | Michalski et al. ............... 210/64 |
| 4,414,334 | A |  | 11/1983 | Hitzman ........................ 435/262 |
| 4,552,591 | A |  | 11/1985 | Millar ........................ 106/18.33 |
| 4,975,109 | A |  | 12/1990 | Friedman, Jr. et al. |
| 5,256,182 | A |  | 10/1993 | Friedman, Jr. et al. |
| 5,284,844 | A |  | 2/1994 | Lorenz et al. |
| 5,547,918 | A |  | 8/1996 | Newton et al. |
| 5,698,108 | A |  | 12/1997 | Okun |
| 5,716,629 | A |  | 2/1998 | Robertson et al. |
| 6,001,158 | A |  | 12/1999 | Elphingstone et al. .... 106/18.31 |
| 6,127,319 | A | * | 10/2000 | House ........................... 507/110 |
| 6,200,586 | B1 |  | 3/2001 | Lambie et al. |
| 6,221,374 | B1 |  | 4/2001 | Ghosh et al. |
| 6,322,749 | B1 |  | 11/2001 | McCarthy et al. ............... 422/37 |
| 6,610,282 | B1 |  | 8/2003 | Ghosh |
| 6,613,720 | B1 |  | 9/2003 | Feraud et al. .................. 507/200 |
| 6,770,677 | B2 |  | 8/2004 | Carlson et al. ................ 514/579 |
| 2003/0156979 | A1 |  | 8/2003 | Carlson et al. |
| 2004/0102501 | A1 |  | 5/2004 | Lutz et al. ...................... 514/389 |
| 2004/0120853 | A1 |  | 6/2004 | Carpenter et al. ............... 422/37 |
| 2005/0250858 | A1 |  | 11/2005 | Wantling et al. |

FOREIGN PATENT DOCUMENTS

RU          2 036 216 C1      5/1995

OTHER PUBLICATIONS

International Search Report and the Written Opinion of the International Searching Authority, mailed Jan. 28, 2008, pp. 12.
Internet article entitled "Low-density propping agents improve hydraulic fracturing in the Permian basin" by Randall Edgeman; WorldOil.com, WorldOil Magazine Special Focus, vol. 225, No. 6, Archive date Jun. 2004; 7 pages.
European Patent Office Communication pursuant to Article 94(3) EPC; mail date: Feb. 22, 2010, for application No. 07-836-429.6-211, which claims priority to U.S. Appl. No. 11/779,509; 3 pages.
Internet Article entitled "PAN Pesticides Database—Chemicals". Dazomet—Identification, toxicity, use, water pollution potential, ecological toxicity and regulatory information, located at http://www.pesticideinfo.org/Detail_Chemical.jsp?Rec_Id=PC34566, pp. 1-6.
Notice of Panel Decision from Pre-Appeal Brief Review for U.S. Appl. No. 11/779,509, filed Jul. 18, 2007; Mail Date: Nov. 27, 2009.
Restriction/Election Office Action for U.S. Appl. No. 11/779,509, filed Jul. 18, 2007; mail date: Oct. 22, 2008.
Final Office Action for U.S. Appl. No. 11/779,509, filed Jul. 18, 2007; mail date: Apr. 6, 2009.
Non-Final Office Action for U.S. Appl. No. 11/779,509, filed Jul. 18, 2007; mail date: Dec. 12, 2008.
Non-Final Office Action for U.S. Appl. No. 11/779,509, filed Jul. 18, 2007; mail date: Sep. 1, 2009.
Notice of Allowance for U.S. Appl. No. 11/779,509, filed Jul. 18, 2007; mail date: Apr. 19, 2010.
BASF Corporation "BASF Datasheet", Undated, 4 pgs.
BASF Technical Information "Protectol and Myacide Dazomet Products" Jun. 2006, supercedes TI/EVD 1707 e May 2006, pp. 1-5.

* cited by examiner

*Primary Examiner* — Timothy J. Kugel
*Assistant Examiner* — Atnaf Admasu
(74) *Attorney, Agent, or Firm* — Cantor Colburn LLP (57) ABSTRACT

A well stimulation fluid includes water, a polymer, and a biocide consisting of 3,5-dimethyl-1,3,5-thiadiazinane-2-thione in an amount effective to inhibit bacterial growth.

14 Claims, 7 Drawing Sheets

Fig. 7

BIOCIDE FOR WELL STIMULATION AND TREATMENT FLUIDS

BACKGROUND

The present disclosure generally relates to biocides, and more particularly, to the use of 3,5-dimethyl-1,3,5-thiadiazinane-2-thione in gas and oil field well stimulation fluids.

After a well is drilled into a subterranean geological formation that contains oil, natural gas, and water, every effort is made to maximize the production of the oil and/or gas. To increase the permeability and flow of the oil and/or gas to the surface, the drilled wells are often subjected to well stimulation. Well stimulation generally refers to several post drilling processes used to clean the well bore, enlarge channels, and increase pore space in the interval to be injected thus making it possible for fluids move more readily into the formation.

A typical well treatment process generally includes pumping specially engineered fluids at high pressure and rate into the subterranean geological formation. The high-pressure fluid (usually water with some specialty high viscosity fluid additives) exceeds the rock strength and opens a fracture in the formation, which can extend out into the geological formation for as much as several hundred feet. Certain commonly used fracturing treatments generally comprise a carrier fluid (usually water or brine) and a polymer, which is also commonly referred to as a friction reducer. Many well stimulation fluids will further comprise a proppant. Other compositions used as fracturing fluids include water with additives, viscoelastic surfactant gels, gelled oils, crosslinkers, oxygen scavengers, and the like.

The well treatment fluid can be prepared by blending the polymer with an aqueous solution (sometimes an oil-based or a multi-phase fluid is desirable); often, the polymer is a solvatable polysaccharide. The purpose of the polymer is generally to increase the viscosity of the fracturing fluid that aids in the creation of a fracture; and to thicken the aqueous solution so that solid particles of proppant can be suspended in the solution for delivery into the fracture.

The polymers used in well treatment fluids are subjected to an environment conducive to bacterial growth and oxidative degradation. The growth of the bacteria on polymers used in such fluids can materially alter the physical characteristics of the fluids. For example, bacterial action can degrade the polymer, leading to loss of viscosity and subsequent ineffectiveness of the fluids. Fluids that are especially susceptible to bacterial degradation are those that contain polysaccharide and/or synthetic polymers such as polyacrylamides, polyglycosans, carboxyalkyl ethers, and the like. In addition to bacterial degradation, these polymers are susceptible to oxidative degradation in the presence of free oxygen. The degradation can be directly caused by free oxygen or mediated by aerobic microorganisms. Thus, for example, polyacrylamides are known to degrade to smaller molecular fragments in the presence of free oxygen. Because of this, biocides and oxygen scavengers are frequently added to the well treatment fluid to control bacterial growth and oxygen degradation, respectively. Desirably, the biocide is selected to have minimal or no interaction with any of the components in the well stimulation fluid. For example, the biocide should not affect fluid viscosity to any significant extent and should not affect the performance of oxygen scavengers contained within the fluid. The oxygen scavengers are generally derived from bisulfite salts.

Other desirable properties for the biocide are (a) cost effectiveness, e.g., cost per liter, cost per square meter treated, and cost per year; (b) safety, e.g., personnel risk assessment (for instance, toxic gases or physical contact), neutralization requirements, registration, discharge to environment, and persistence; (c) compatibility with system fluids, e.g., solubility, partition coefficient, pH, presence of hydrogen sulfide, temperature, hardness, presence of metal ions or sulfates, level of total dissolved solids; (d) compatibility with other treatment chemicals, e.g., corrosion inhibitors, scale inhibitors, demulsifiers, water clarifiers, well stimulation chemicals, and polymers; and (e) handling, e.g., corrosiveness to metals and elastomers, freeze point, thermal stability, and separation of components.

Current well stimulation fluids generally employ either glutaraldehyde or tetra-kis-hydroxymethyly-phosphonium sulfate (THPS) to control bacterial contamination. Glutaraldehyde can be problematic because it is hazardous to handle and has environmental concerns. Moreover, it has been observed that glutaraldehyde can deleteriously affect the fluid viscosity of the well treatment fluid at elevated temperatures; temperatures that are commonly observed during use of the well treatment fluid. This can be problematic in fracturing applications since the higher maintained fluid viscosity down hole could hinder flow back. In addition, glutaraldehyde has been shown to negatively impact the behavior of the oxygen scavenger.

With regard to THPS, although it has been shown to perform better than glutaraldehyde with respect to interaction with the oxygen scavengers, THPS has been found to interact with the polymer and limit viscosity development when added pre-inversion and post-inversion. That is, THPS has been observed to interact with the polymer during shear and significantly reduce fluid viscosity.

Thus, there remains a need for a more versatile biocide for use in well stimulation fluids that can effectively control bacterial contamination and have minimal interaction with the polymer and/or oxygen scavenger.

BRIEF SUMMARY

Disclosed herein are well stimulation fluid compositions and methods for inhibiting bacterial growth in the well stimulation fluid. In one embodiment, the well stimulation fluid comprises water; a polymer selected from the group consisting of galactomannan polymers, derivatized galactomannan polymers, starch, xanthan gums, hydroxycelluloses, hydroxyalkyl celluloses, polyvinyl alcohol polymers, copolymers of vinyl alcohol and vinyl acetate, and polymers that are a product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide and other monomers currently used for oil well treatment polymers; and a biocide consisting of 3,5-dimethyl-1,3,5-thiadiazinane-2-thione in an amount effective to inhibit bacterial growth.

A method for inhibiting bacterial contamination in a well stimulation fluid comprising adding an effective bacterial inhibiting amount of a biocide consisting of 3,5-dimethyl-1,3,5-thiadiazinane-2-thione to the well stimulation fluid.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

The present disclosure is generally directed to the use of 3,5-dimethyl-1,3,5-thiadiazinane-2-thione (also commonly referred to as "Dazomet") as a biocide in gas and oil well stimulations. Surprisingly, relative to popular biocides currently used in well stimulation fluids, 23,5-dimethyl-1,3,5-thiadiazinane-2-thione is much more versatile and provides a reduced interference with friction reducers in the well stimulation fluid, a reduced interference with oxygen scavengers, and has minimal interaction with friction reducers at elevated temperatures relative to conventional biocides such as glutaraldehyde or THPS. The 3,5-dimethyl-1,3,5-thiadiazinane-2-thione can be used in an aqueous solution or can be added to the well treatment fluid as an emulsified fluid.

The well treatment fluid comprises at least one polymer. Preferred classes of polymers are polysaccharides or synthesized polymers. Suitable polymers include, but are not intended to be limited to, galactomannan polymers and derivatized galactomannan polymers; starch; xanthan gums; hydroxycelluloses; hydroxyalkyl celluloses; polyvinyl alcohol polymers (such as homopolymers of vinyl alcohol and copolymers of vinyl alcohol and vinyl acetate); and polymers (such as homopolymers, copolymers, and terpolymers) that are the product of a polymerization reaction comprising one or more monomers selected from the group consisting of vinyl pyrrolidone, 2-acrylamido-2-methylpropanesulfonic acid, acrylic acid and acrylamide, methacrylic acid, styrene sulfonic acid, acrylamide and other monomers currently used for oil well treatment polymers, among others. Certain polyvinyl alcohol polymers can be prepared by hydrolyzing vinyl acetate polymers. Preferably the polymer is water-soluble. Specific examples of polymers that can be used include, but are not intended to be limited to hydrolyzed polyacrylamide, guar gum, hydroxypropyl guar gum, carboxymethyl guar gum, carboxymethylhydroxypropyl guar gum, hydroxyethyl cellulose, carboxymethylhydroxyethyl cellulose, hydroxypropyl cellulose, copolymers of acrylic acid and acrylamide, xanthan, starches, and mixtures thereof, among others.

The amount of 3,5-dimethyl-1,3,5-thiadiazinane-2-thione in the well stimulation fluid will vary, generally depending on the polymer employed, the conditions of the water and the extent of prior bacterial, the time period of bacterial growth, general environment where the biocide will be used, and the like. Thus, it is not possible to delineate a minimal amount, however, one skilled in the art will be able to determine the minimal amount with undue experimentation. There is no maximum, amount, although large excess may not be desirable for economic reasons.

The 3,5-dimethyl-1,3,5-thiadiazinane-2-thione can be added directly as an emulsification, solid, or solution to the fluid used to make the well stimulation fluid, to a concentrated polymer solution, and/or may be made on a slug dose basis. The present disclosure is not intended to be limited to a particular method for making the well stimulation fluid.

Examples of bacteria to which 3,5-dimethyl-1,3,5-thiadiazinane-2-thione is effective and are commonly found in oil and gas field fluids and waters include, but are not intended to be limited to, aerobic and non-aerobic bacteria, sulfur reducing bacteria, acid producing bacteria and the like. Specific examples include, but are not limited to, pseudomonad species, bacillus species, enterobacter species, serratia species, clostridia species, and the like. It should be noted that it is expected that the use of 3,5-dimethyl-1,3,5-thiadiazinane-2-thione in the well stimulation fluid will be effective to inhibit algae and fungi formation at the same biocidal concentrations for bacterial effectiveness.

Well stimulation and completion (treatment) fluid compositions of the present disclosure can further comprise other additives. Additives are generally included to enhance the stability of the fluid composition itself to prevent breakdown caused by exposure to oxygen, temperature change, trace metals, constituents of water added to the fluid composition, and to prevent non-optimal crosslinking reaction kinetics. The choice of components used in fluid compositions is dictated to a large extent by the properties of the hydrocarbon-bearing formation on which they are to be used. Such additives can be selected from the group consisting of water, oils, salts (including organic salts), crosslinkers, polymers, biocides, corrosion inhibitors and dissolvers, pH modifiers (e.g., acids and bases), breakers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, fluid loss additives, chemical grouts, diverters, sand consolidation chemicals, proppants, permeability modifiers, viscoelastic fluids, gases (e.g., nitrogen and carbon dioxide), and foaming agents.

For well stimulation, the fluid containing the 3,5-dimethyl-1,3,5-thiadiazinane-2-thione can be injected directly into the well bore to react with and/or dissolve substances affecting permeability; injected into the wellbore and into the formation to react with and/or dissolve small portions of the formation to create alternative flowpaths; or injected into the well bore and into the formation at pressures effective to fracture the formation.

EXAMPLES

In the following examples, an in-house constructed Inversion Loop was modified with a Grace M3500 viscometer for periodically measuring fluid viscosity as a function of time.

The ORP apparatus included a HACH sensION pH meter with a combination ORP electrode.

Example 1

In this example, the post inversion viscosity of a polymeric fluid having a biocide at different concentrations was analyzed relative to a control that did not include a biocide. The biocides analyzed included glutaraldehyde obtained commercially under the trade name AMA-4750, THPS, 3,5-dimethyl-1,3,5-thiadiazinane-2-thione obtained commercially under the trade name AMA-324, and an emulsion of 3,5-dimethyl-1,3,5-thiadiazinane-2-thione obtained commercially under the trade name AMA-420. A 0.1% aqueous stock solution of polyacrylamide commercially obtained under the trade name Callaway 4330 was made and allowed to age for about 30 minutes. For each of the samples tested, 1,500 grams of the stock solution was first added to the inversion loop, recirculated, and the viscosity measured. After 2 minutes, the biocide was added at an initial concentration of 250 parts per million (ppm) and allowed to recirculate for 2 minutes at which time the viscosity was recorded. Additional 250 ppm increments of the biocide were added and the viscosities measured after recirculation in the inversion loop for an additional 2 minutes.

Figure 1:
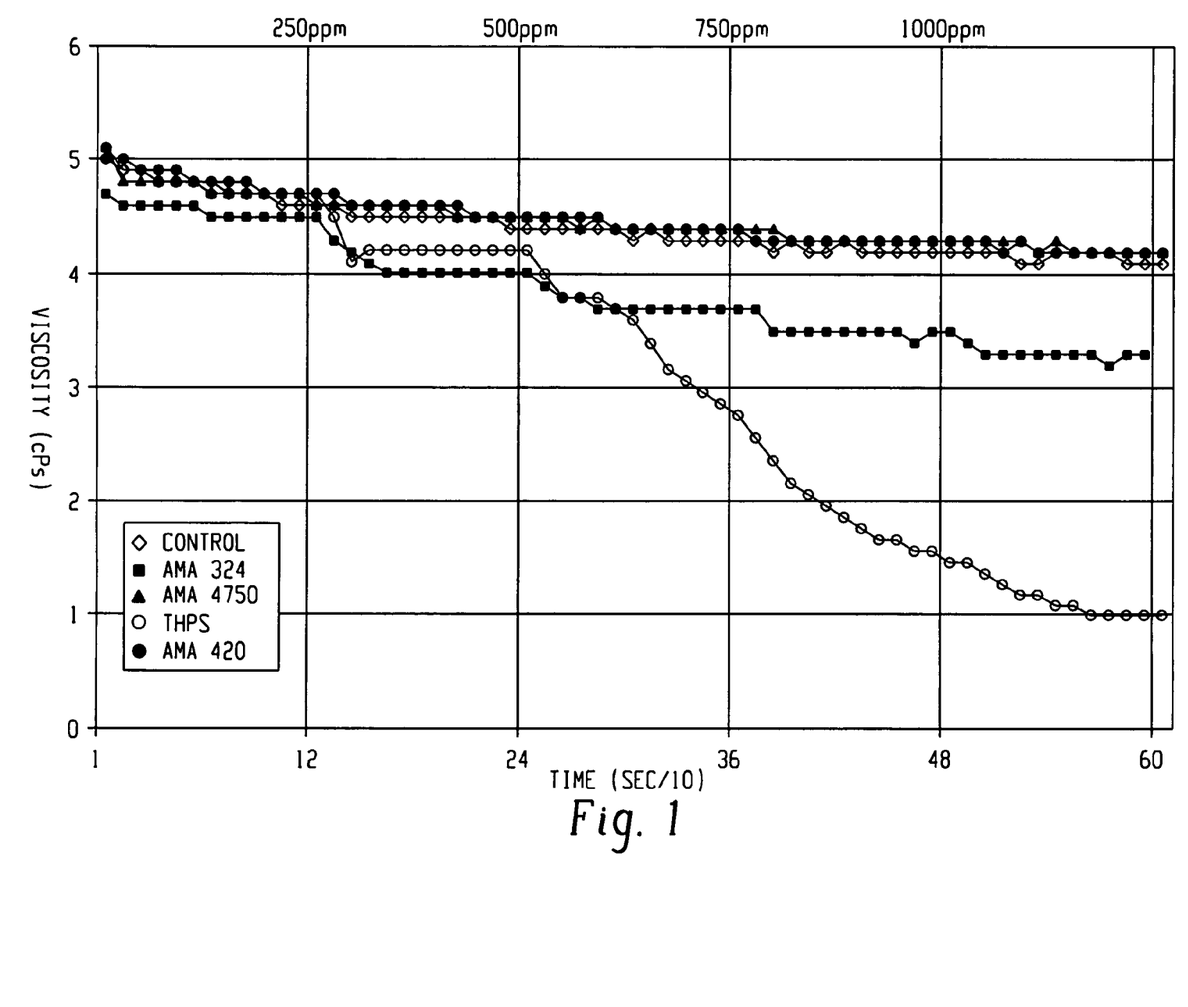
FIG. 1 graphically illustrates post inversion viscosity in centipoise (cPs) as a function of time for polymer fluid samples containing varying amounts of biocide relative to a control not containing the biocide.

The test results are graphically illustrated in FIG. 1. As shown, polymer shear is observed as a function of recirculation in the Inversion Loop apparatus (see control). For post inversion, both AMA-4750 (glutaraldehyde) and AMA-420 exhibited minimal effect on viscosity, even at the higher concentrations. AMA-324, exhibited a slight reduction in polymer viscosity as a function of increasing concentration whereas a significant viscosity reduction was observed with THPS.

Example 2

Figure 2:
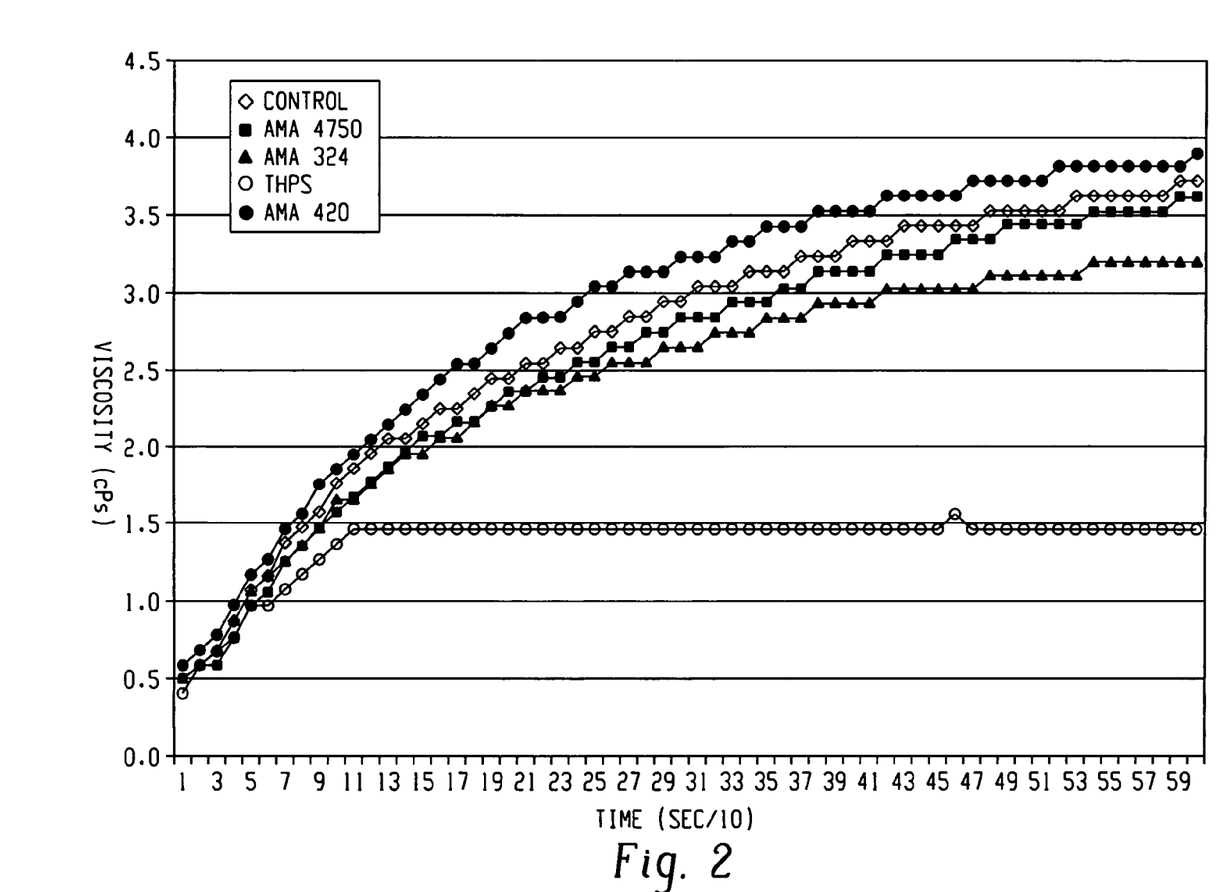
FIG. 2 graphically illustrates pre-inversion viscosity as a function of time for polymer fluid samples containing 500 parts per million of biocide relative to a control not containing the biocide.
Figure 3:
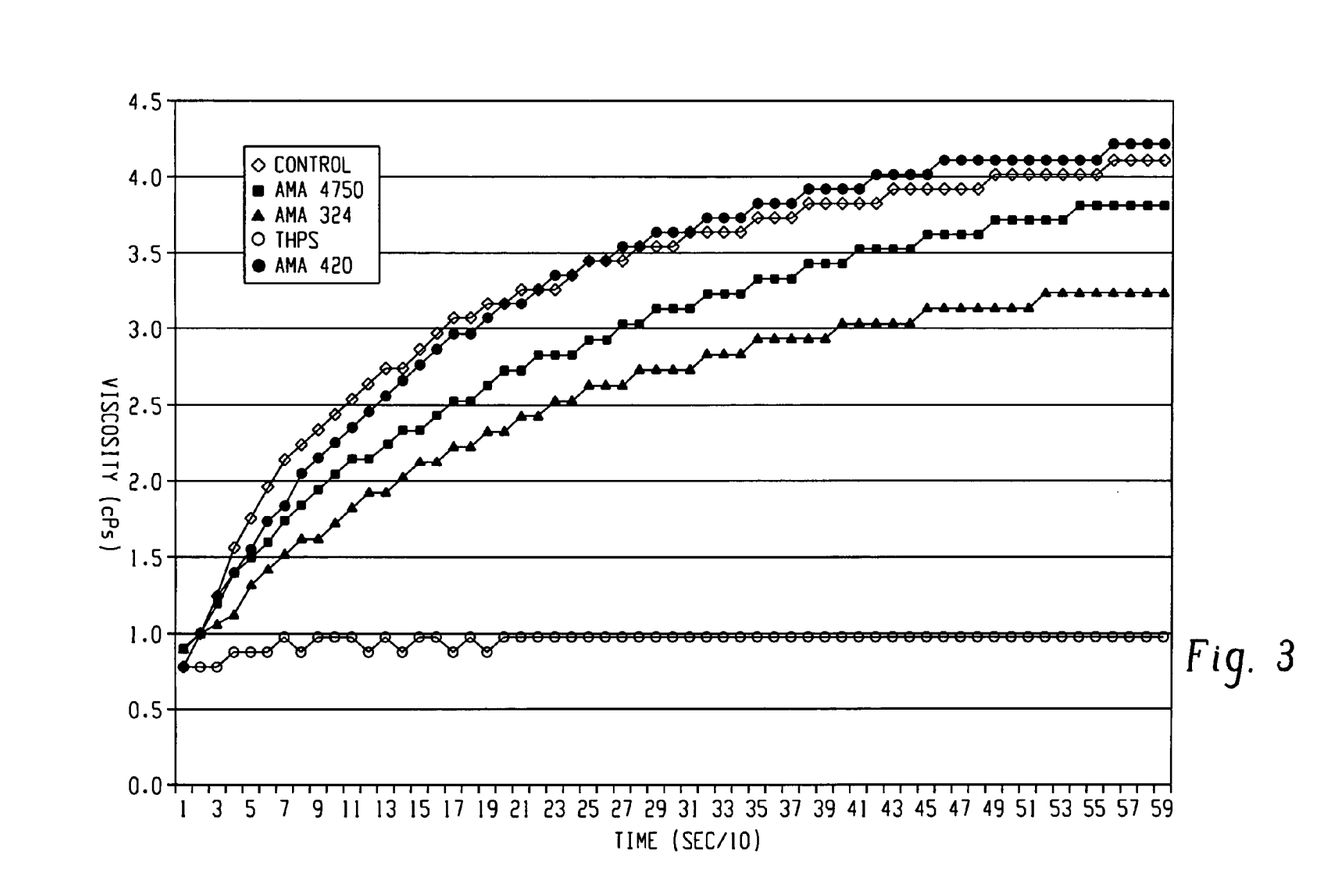
FIG. 3 graphically illustrates pre-inversion viscosity as a function of time for polymer fluid samples containing 1,000 parts per million of biocide relative to a control not containing the biocide.

In this example, pre-inversion viscosity was measured for the various biocide/polymer fluids and control of Example 1, which were prepared in accordance with Example 1. In those samples containing the biocide, the biocide concentrations examined were 500 ppm and 1,000 ppm. The results are shown in FIGS. 2 and 3, respectively.

The results clearly show that THPS interacts with the polymer resulting in a significant decrease in viscosity. In contrast, the glutaraldehyde and the samples containing the 3,5-dimethyl-1,3,5-thiadiazinane-2-thione biocide showed minimal interaction relative to the control sample. Interestingly, the emulsified 3,5-dimethyl-1,3,5-thiadiazinane-2-thione exhibited an increase in viscosity relative to the control. While not wanting to be bound by theory, the components used to form the emulsion are believed to react with or interact with the polymer.

Example 3

Figure 4:
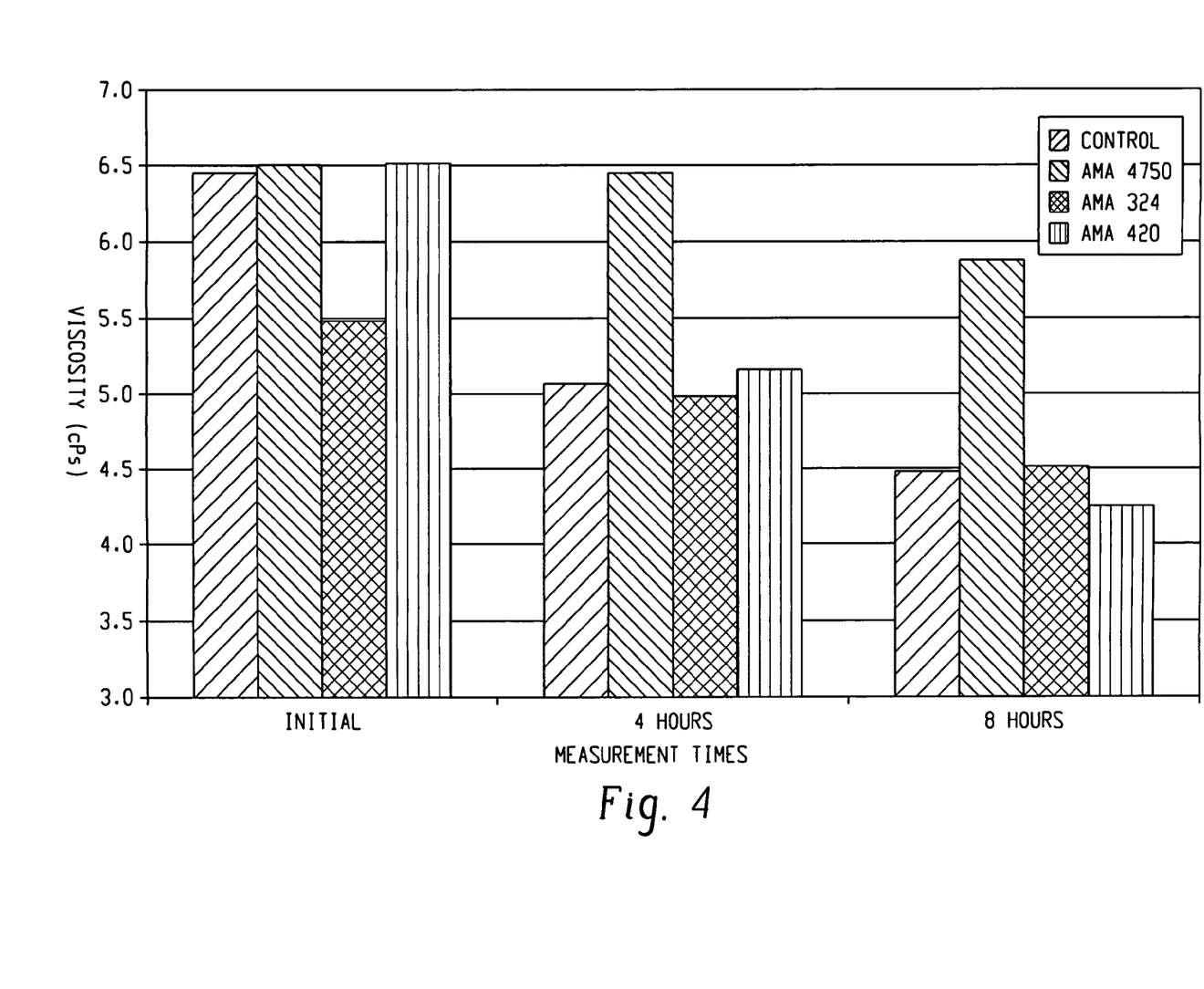
FIG. 4 graphically illustrates a bar graph of post inversion viscosity as a function of time for polymer fluid samples heated at a temperature of 180° F. for defined period of times containing 500 parts per million of biocide relative to a control not containing the biocide.

In this example, the effect of heat on the biocide/polymer fluids and control of Example 1 was analyzed. THPS was not analyzed because of its observed interaction at room temperature in the earlier examples. For each of the samples that were tested, 500 ppm of the biocide was added to 1,000 grams of the polyacrylamide stock solution of Example 1. The samples were added to the inversion loop, recirculated for 1 minute, and the viscosity measured. The samples were then placed into an oven at 180° F. for 4 hours, and were allowed to cool to room temperature (77° F.). Once the samples were at room temperature, the viscosity was measured and then return to the oven for an additional 4 hours at which the time sample was cooled to room temperature and the viscosity measured. The results are shown in FIG. 4.

From the results above, it can be noted that polymer viscosity degrades with heat over time. For each test, the initial viscosity measurement shows only the effect of the biocide on the polymer viscosity. AMA-324 is the only one to give a significant reduction from that of the control after the first heating cycle, which was expected given the results seen in the previous post-inversion viscosity testing. After four hours at temperature, however, the viscosities of the control, AMA-324, and the AMA-420 are essentially the same, while the viscosity of the AMA-4750 test sample (glutaraldehyde) has maintained nearly all its viscosity. This same effect is seen at the eight-hour mark, with the AMA-4750 sample showing only slightly reduced viscosity. While not wanting to be bound by theory, it is believed that the glutaraldehyde slightly crosslinked the polymer at elevated temperature, thus allowing the polymer viscosity to persist above that of the polymer alone. Reactions between dialdehyde and acrylamide are quite well documented. This effect could be considered problematic in fracturing applications since the higher maintained viscosity down hole could potentially hinder flow back.

Example 4

Figure 5:
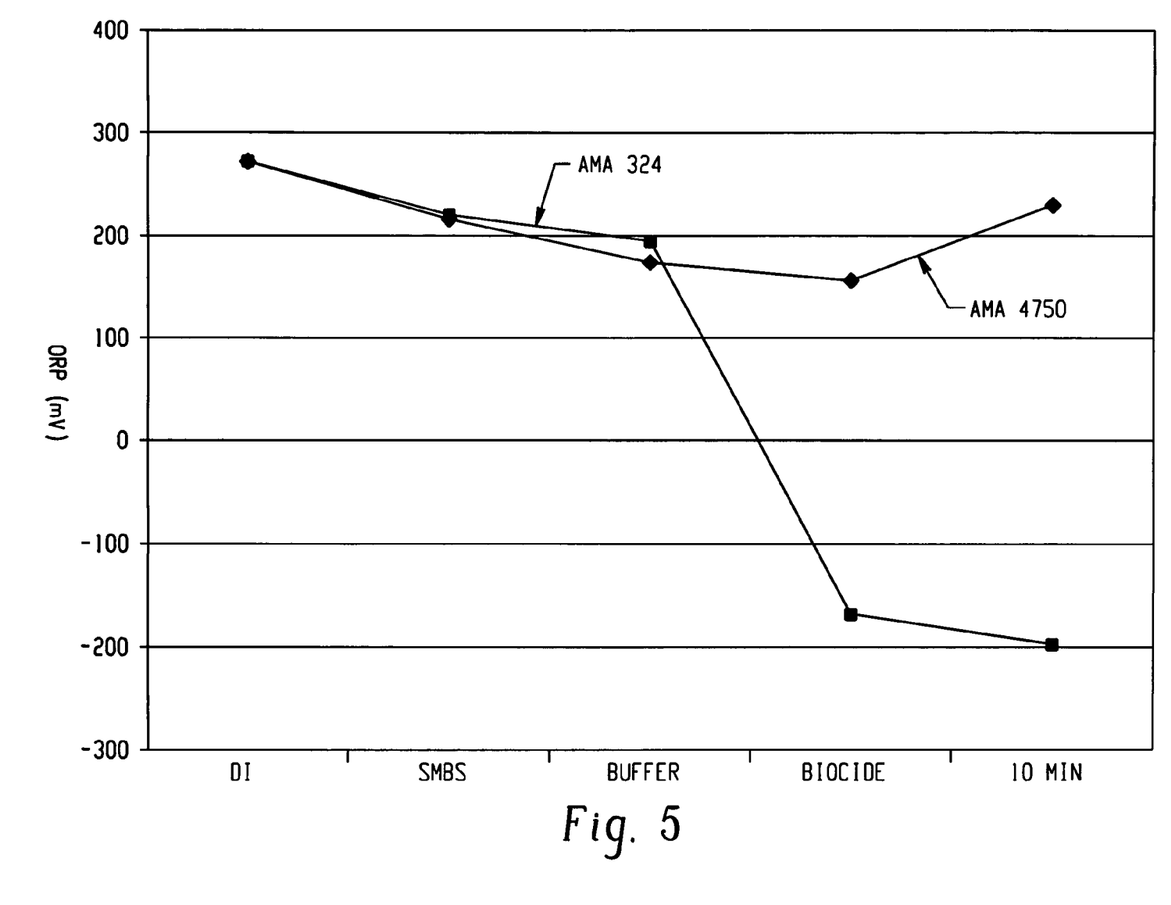
FIG. 5 graphically illustrates oxygen reduction potential in millivolts for polymer samples containing 120 parts per kilion of sodium metabisulfite buffered to a pH of 6.4 and having 500 parts per million of THPS or non-emulsified 3,5-dimethyl-1,3,5-thiadiazinane-2-thione.

In this example, the effect of AMA-324 (non-emulsified 3,5-dimethyl-1,3,5-thiadiazinane-2-thione) and AMA-4750 (glutaraldehyde) on the oxygen scavenger was examined. To a beaker containing 500 milliliters of deionized water, a 120 ppm dose of sodium metabisulfite (SMBS) was added and the pH and oxygen reduction potential (ORP) were recorded. Once stabilized, phosphate buffer was added to increase the pH to 6.4 and the ORP recorded. Finally, the particular biocide tested was added at a concentration of 500 ppm. The ORP was recorded initially and after a period of 10 minutes. The results are shown in FIG. 5.

From these results, it can be noted that there is a significant difference in ORP response upon addition of each respective biocide. ORP is an indication of a solution's ability to oxidize or reduce another solution/species. Theoretically, the lower the ORP, the higher the ratio of reduced species to oxidized species. AMA-4750 does not significantly impact ORP upon initial addition, and after 10 minutes of residence time the ORP actually increases nearly to the level of the DI $H_2O$ alone. This would indicate a negative impact on the bisulfite scavenger. The reactions between aldehydes and bisulfite are well documented and are often used for melting point determinations In contrast, upon addition of the AMA-324, the ORP of the solution is lowered significantly. The lower value given by the AMA-324 solution would indicate a more preferable environment for $O_2$ scavenging to occur.

Example 5

In this example, biocidal effectiveness to acid producing bacteria was examined for glutaraldehyde at 200 parts per million (ppm), THPS at 200 ppm, and 2,5-dimethyl-1,3,5-thiadiazinane-2-thione (AMA-324) at 400 ppm and 1000 ppm.

A five gallon sample of Chief Donaldson #1—Frac Pond from B. J. Chemical Services; Tomball, Tex. was employed for these studies. The pH was measured at 6.6 and the redox potential was at 98. The sample included anaerobic sulfate reducing and acid producing bacteria. Both organism types were present in this sample at $10^4$ cfu/mL however, an additional inoculum was added to increase numbers for both organism types to about $10^9$ cfu/mL. Serial dilutions were made using 1 cc sterile syringes to inoculate 9.0 mL anaerobic American Petroleum Institute (API) broth with an iron nail designed for sulfate reducing bacteria (SRB). In addition, facultative acid producing bacteria (AB) were tested using serial dilutions in 9 mL phenol red (PR) broth. Each media salinity was matched to the substrate salinity that was measured by percent Total Dissolved Solids (TDS). Substrate water was divided into 99.0 g aliquots for each tested biocide concentration and an untreated control. The biocides were prepared neat or "as is" in stock solutions at concentrations one hundred times that required so that 1 g of the biocide stock solution added to 99 g aliquots of substrate would produce the required test concentration and a total weight of 100 g. In all cases the concentration was determined on a weight/weight basis of parts per million (milligrams per kilogram). Each aliquot was mixed well after the addition of the biocide and maintained at 25° C. for the duration of study. One gram of sterile water was added to the untreated controls. Serial dilutions were done in each media for each aliquot at each contact time. The untreated controls were diluted to $10^9$ and treated aliquots diluted to $10^6$. Untreated and treated aliquots were sampled into API and PR media at 7, 14, 21, 28, 35 and 42 days with a 1 g challenge after sampling on days 21, 35, and 42 using 0.5 g of SRB positive API broth and 0.5 g of AP positive PR broth. API bottles were incubated aerobically at 35° C. for 21 days checking periodically for bottles, which turned black indicating positive growth. PR bottles were incubated aerobically at 35° C. for 14 days checking periodically for bottles, which turned yellow indicating positive growth. A color change at the highest dilution indicated the log quantity of organisms present.

Figure 6:
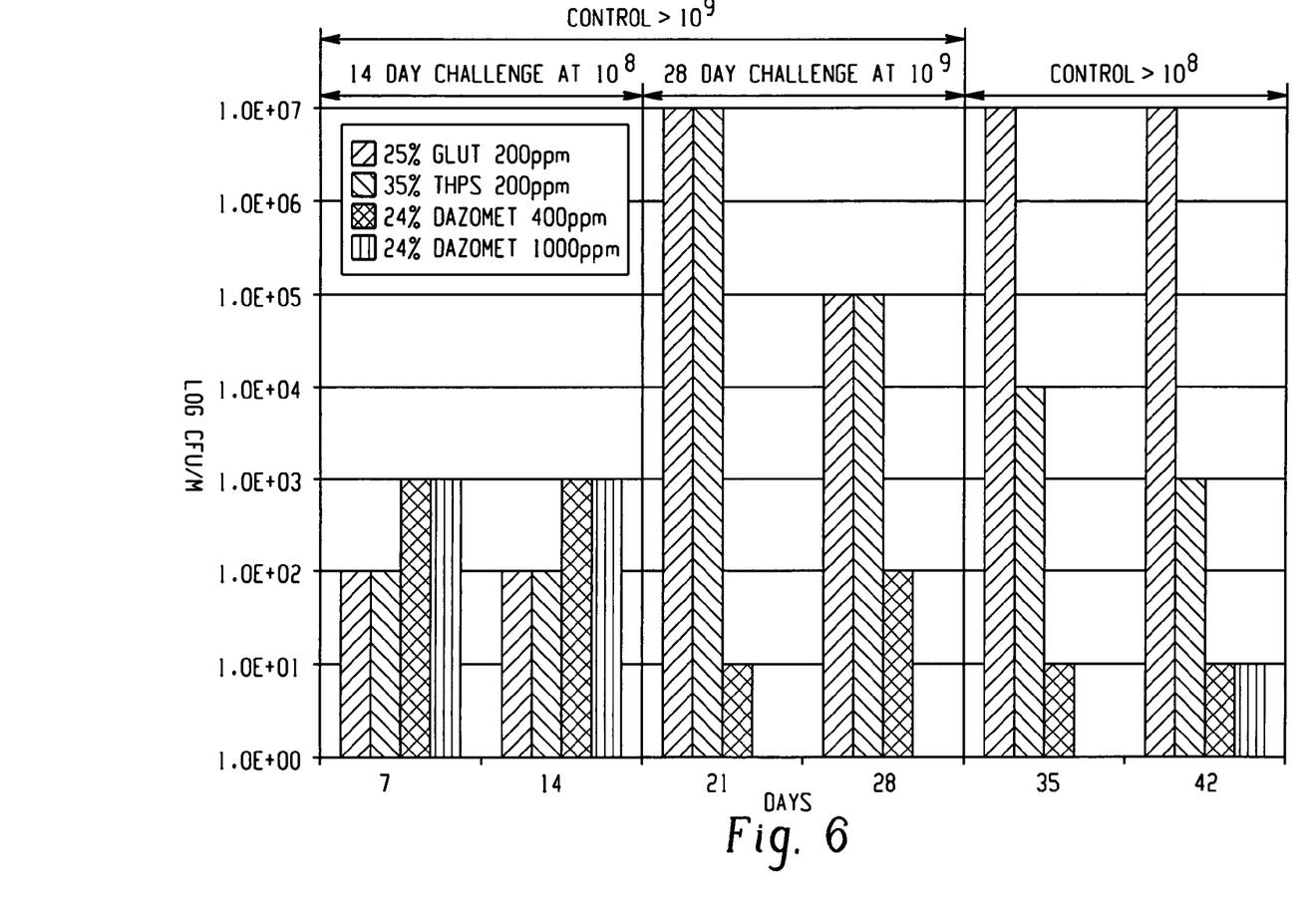
FIG. 6 is a bar chart illustrating effectiveness of various biocides including 3,5-dimethyl-1,3,5-thiadiazinane-2-thione for controlling acid producing bacteria as a function of time.
Figure 7:
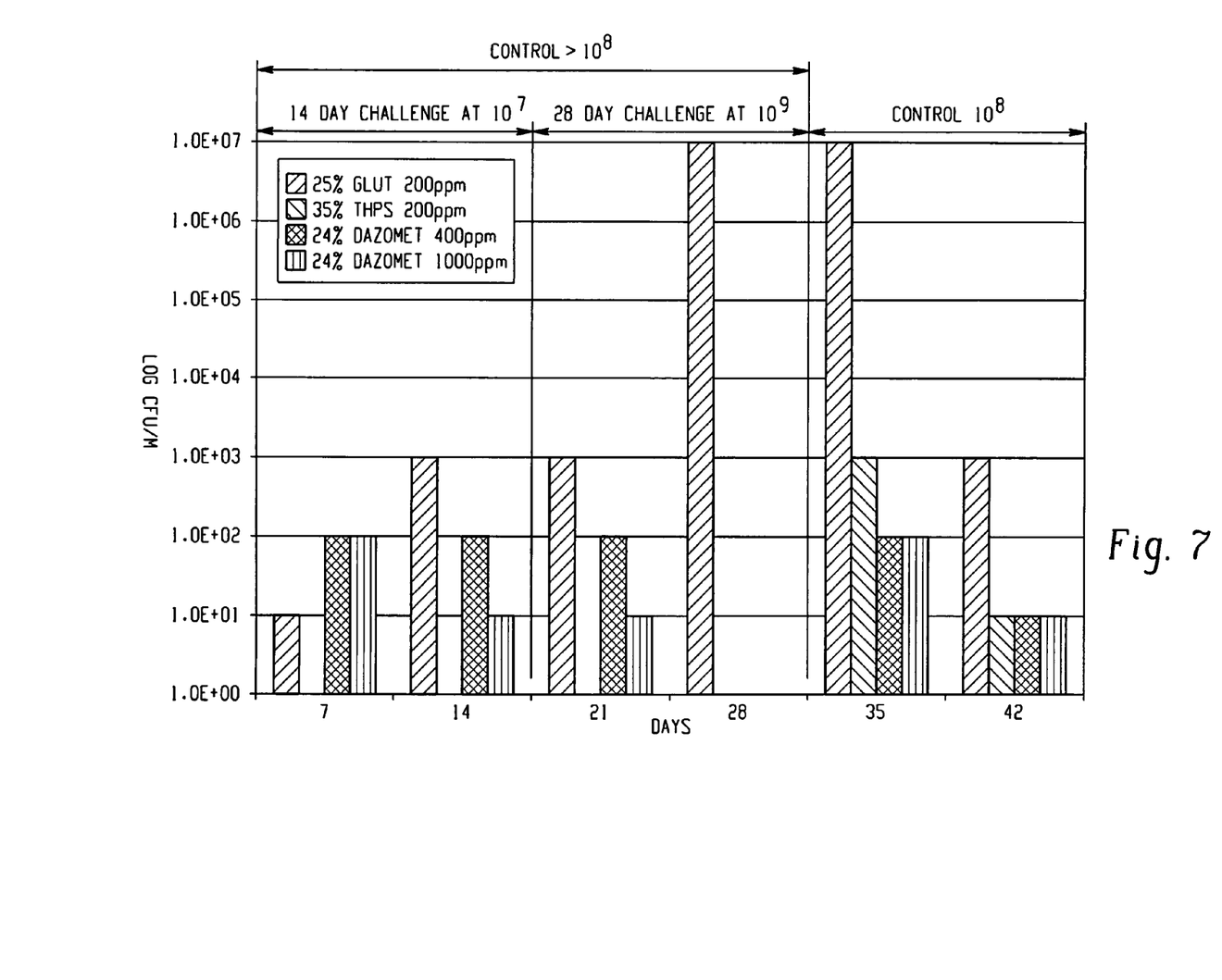
FIG. 7 is a bar chart illustrating effectiveness of various biocides including 3,5-dimethyl-1,3,5-thiadiazinane-2-thione for controlling sulfur reducing bacteria as a function of time.

The results are shown in FIG. 6, wherein the counts are expressed in log values as indicated. The acid producing bacterial counts (AB) in the control decreased one log value from $10^9$ to $10^8$ over the course of the 42-day study. Although kill was a bit slower in comparison with industry standards of 25% gluteraldehyde and 35% THPS at 200 ppm, long term preservation was very good and AMA-324 maintained control through two substantial challenges for which treatment at all levels of 25% Glut and at 200 ppm THPS did not.

Example 6

In this example, biocidal effectiveness to sulfur reducing bacteria was examined in accordance with Example 5.

Sulfate reducing bacterial counts (SRB) in the control decreased from $10^8$ to $10^1$ over the 42-day course of the study. As above with AB, AMA®-324 gave good control especially over the long term at all concentrations tested. Comparatively, 25% gluteraldehyde AMA®-3725 was good at quick kill but began to lose control of the SRB count after challenging. The 35% THPS showed excellent quick kill and long term preservation of SRB counts.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aqueous production well composition for injection into a production well, comprising:
water;
a polymer selected from the group consisting of galactomannan polymers, derivatized galactomannan polymers, starch, xanthan gums, hydroxycelluloses, hydroxyalkyl celluloses, polyvinyl alcohol polymers, copolymers of vinyl alcohol and vinyl acetate, and polymers that are a product of a polymerization reaction comprising one or more monomers selected from the group consisting of vinyl pyrrolidone, 2-acrylamido-2-methylpropanesulfonic acid, acrylic acid and acrylamide; and
a biocide consisting of 3,5-dimethyl-1,3,5-thiadiazinane-2-thione in an amount effective to inhibit bacterial growth.

2. The aqueous production well composition of claim 1, further comprising an additive selected from a group consisting of oils, salts, crosslinkers, additional polymers, corrosion inhibitors and dissolvers, pH modifiers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, sand consolidation chemicals, proppants, permeability modifiers, viscoelastic fluids, gases, foaming agents, and mixtures thereof.

3. The aqueous production well composition of claim 1, wherein the 3,5-dimethyl-1,3,5-thiadiazinane-2-thione is in an emulsion.

4. The aqueous production well composition of claim 1, wherein the 3,5-dimethyl-1,3,5-thiadiazinane-2-thione is an aqueous solution.

5. The aqueous production well composition of claim 1, wherein the well stimulation fluid has a viscosity substantially the same as a control well stimulation fluid without the biocide.

6. The aqueous production well composition of claim 1, wherein the well stimulation fluid has a viscosity substantially the same as a control well stimulation fluid without the biocide after heating the fluid to a temperature of 180° Fahrenheit for a period of 8 hours.

7. The aqueous production well composition of claim 1, further comprising an oxygen scavenger, wherein the biocide maintains or increases an oxidation reduction potential relative to a well stimulation fluid without the biocide.

8. A method for inhibiting bacterial contamination with an aqueous production well composition for injection into a production well, comprising adding an effective bacterial inhibiting amount of a biocide consisting of 3,5-dimethyl-1,3,5-thiadiazinane-2-thione to the aqueous production well composition; and injecting the aqueous production well composition into the production well.

9. The method of claim 8, wherein the 3,5-dimethyl-1,3,5-thiadiazinane-2-thione is in an emulsion.

10. The method of claim 8, wherein the aqueous production well composition comprises a polymer selected from the group consisting of galactomannan polymers, derivatized galactomannan polymers, starch, xanthan gums, hydroxycelluloses, hydroxyalkyl celluloses, polyvinyl alcohol polymers, copolymers of vinyl alcohol and vinyl acetate, and polymers that are a product of a polymerization reaction comprising one or more monomers selected from the group consisting of vinyl pyrrolidone, 2-acrylamido-2-methylpropanesulfonic acid, acrylic acid and acrylamide.

11. The method of claim 8, wherein the aqueous production well composition further comprises an additive selected from a group consisting of oils, salts, crosslinkers, additional polymers, corrosion inhibitors and dissolvers, pH modifiers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, sand consolidation chemicals, proppants, permeability modifiers, viscoelastic fluids, gases, foaming agents, and mixtures thereof.

12. The method of claim 8, wherein the aqueous production well composition has a viscosity substantially the same as a control production well composition without the biocide.

13. The method of claim 8, wherein the aqueous production well composition has a viscosity substantially the same as a control production well composition without the biocide after heating the fluid to a temperature of 180° Fahrenheit for a period of 8 hours.

14. The method of claim 8, wherein the aqueous production well composition further comprises an oxygen scavenger, wherein the biocide maintains or increases an oxidation reduction potential relative to a production well composition without the biocide.

* * * * *

UNITED STATES PATENT AND TRADEMARK OFFICE
CERTIFICATE OF CORRECTION

PATENT NO. : 7,906,463 B2
APPLICATION NO. : 11/497724
DATED : March 15, 2011
INVENTOR(S) : Starkey, II et al.

It is certified that error appears in the above-identified patent and that said Letters Patent is hereby corrected as shown below:

IN THE SPECIFICATIONS:

In column 3, line 37: Please delete "23,5-dimethyl-1,3,5-thiadiazinane-2-thione" and replace with "3,5-dimethyl-1,3,5-thiadiazinane-2-thione".

In column 6, line 58: Please delete "2,5-dimethyl-1,3,5-thiadiazinane-2-thione" and replace with "3,5-dimethyl-1,3,5-thiadiazinane-2-thione".

Signed and Sealed this
Thirty-first Day of May, 2011

David J. Kappos
*Director of the United States Patent and Trademark Office*

(12) EX PARTE REEXAMINATION CERTIFICATE (9445th)
United States Patent
Starkey, II et al.

(10) Number: US 7,906,463 C1
(45) Certificate Issued: *Dec. 17, 2012

(54) BIOCIDE FOR WELL STIMULATION AND TREATMENT FLUIDS

(75) Inventors: Ronald Joe Starkey, II, Canton, GA (US); Geoffrey Allen Monteith, Midland, GA (US); Carl Wilhelm Aften, Fortson, GA (US)

(73) Assignee: Kemira Chemicals Inc., Kennesaw, GA (US)

Reexamination Request:
No. 90/011,657, Apr. 22, 2011

Reexamination Certificate for:
Patent No.: 7,906,463
Issued: Mar. 15, 2011
Appl. No.: 11/497,724
Filed: Aug. 2, 2006

Certificate of Correction issued May 31, 2011.

( * ) Notice: This patent is subject to a terminal disclaimer.

(51) Int. Cl.
*C09K 8/68* (2006.01)
*C09K 8/60* (2006.01)
*C09K 8/588* (2006.01)
*C09K 8/528* (2006.01)
*C09K 8/584* (2006.01)
*E21B 43/00* (2006.01)

(52) U.S. Cl. ........ 507/211; 507/221; 507/224; 507/256; 507/201; 507/213; 507/252; 507/920; 507/209

(58) Field of Classification Search ................. None
See application file for complete search history.

(56) References Cited

To view the complete listing of prior art documents cited during the proceeding for Reexamination Control Number 90/011,657, please refer to the USPTO's public Patent Application Information Retrieval (PAIR) system under the Display References tab.

*Primary Examiner* — Evelyn Huang (57) ABSTRACT

A well stimulation fluid includes water, a polymer, and a biocide consisting of 3,5-dimethyl-1,3,5-thiadiazinane-2-thione in an amount effective to inhibit bacterial growth.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7 and 10 are cancelled.

Claims 1 and 8 are determined to be patentable as amended.

Claims 2-6, 9 and 11-14, dependent on an amended claim, are determined to be patentable.

New claims 15-20 are added and determined to be patentable.

1. An aqueous production well composition for injection into a production well, comprising:
    water;
    a polymer selected from the group consisting of [galactomannan polymers, derivatized galactomannan polymers, starch, xanthan gums, hydroxycelluloses, hydroxyalkyl celluloses, polyvinyl alcohol polymers, copolymers of vinyl alcohol and vinyl acetate, and] polymers that are a product of a polymerization reaction comprising one or more monomers selected from the group consisting of [vinyl pyrrolidone,] 2-acrylamido-2-methylpropanesulfonic acid, acrylic acid and acrylamide; and
    a biocide consisting of 3,5-dimethyl-1,3,5-thiadiazinane-2-thione in an amount effective to inhibit bacterial growth.

8. A method for inhibiting bacterial contamination with an aqueous production well composition for injection into a production well, comprising adding an effective bacterial inhibiting amount of a biocide consisting of 3,5-dimethyl-1,3,5-thiadiazinane-2-thione to the aqueous production well composition; and injecting the aqueous production well composition into the production well;
    *wherein the aqueous production well composition comprises a polymer selected from the group consisting of polymers that are a product of a polymerization reaction comprising one or more monomers selected from the group consisting of 2-acrylamido-2-methylpropanesulfonic acid, acrylic acid and acrylamide.*

*15. The aqueous production well composition of claim 1, wherein the polymer is selected from the group consisting of polymers that are a product of a polymerization reaction comprising 2-acrylamido-2-methylpropanesulfonic acid.*

*16. The aqueous production well composition of claim 1, wherein the polymer is selected from the group consisting of polymers that are a product of a polymerization reaction comprising acrylic acid.*

*17. The aqueous production well composition of claim 1, wherein the polymer is selected from the group consisting of polymers that are a product of a polymerization reaction comprising acrylamide.*

*18. The method of claim 8, wherein the polymer is selected from the group consisting of polymers that are a product of a polymerization reaction comprising 2-acrylamido-2-methylpropanesulfonic acid.*

*19. The method of claim 8, wherein the polymer is selected from the group consisting of polymers that are a product of a polymerization reaction comprising acrylic acid.*

*20. The method of claim 8, wherein the polymer is selected from the group consisting of polymers that are a product of a polymerization reaction comprising acrylamide.*

\* \* \* \* \*

(12) EX PARTE REEXAMINATION CERTIFICATE (10252nd)
United States Patent
Starkey, II et al.

(10) Number: US 7,906,463 C2
(45) Certificate Issued: *Aug. 8, 2014

(54) BIOCIDE FOR WELL STIMULATION AND TREATMENT FLUIDS (75) Inventors: Ronald Joe Starkey, II, Canton, GA (US); Geoffrey Allen Monteith, Midland, GA (US); Carl Wilhelm Aften, Fortson, GA (US)

(73) Assignee: Kemira Chemicals Inc., Kennesaw, GA (US)

Reexamination Request:
No. 90/012,819, Mar. 25, 2013

Reexamination Certificate for:
Patent No.: 7,906,463
Issued: Mar. 15, 2011
Appl. No.: 11/497,724
Filed: Aug. 2, 2006

Reexamination Certificate C1 7,906,463 issued Dec. 17, 2012

Certificate of Correction issued May 31, 2011

(*) Notice: This patent is subject to a terminal disclaimer.

(51) Int. Cl.
*C09K 8/68* (2006.01)
*C09K 8/60* (2006.01)
*C09K 8/588* (2006.01)
*C09K 8/528* (2006.01)
*C09K 8/584* (2006.01)
*E21B 43/00* (2006.01)
*C09K 8/88* (2006.01)

(52) U.S. Cl.
CPC . *C09K 8/605* (2013.01); *C09K 8/88* (2013.01); *Y10S 507/92* (2013.01)
USPC ........... 507/211; 507/201; 507/209; 507/213; 507/221; 507/224; 507/252; 507/256; 507/920

(58) Field of Classification Search
None
See application file for complete search history.

(56) References Cited

To view the complete listing of prior art documents cited during the proceeding for Reexamination Control Number 90/012,819, please refer to the USPTO's public Patent Application Information Retrieval (PAIR) system under the Display References tab.

*Primary Examiner* — Elizabeth McKane (57) ABSTRACT

A well stimulation fluid includes water, a polymer, and a biocide consisting of 3,5-dimethyl-1,3,5-thiadiazinane-2-thione in an amount effective to inhibit bacterial growth.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7 and 10 were previously cancelled.

Claim 16 is cancelled.

Claims 1, 5, 6, 8 and 13 are determined to be patentable as amended.

Claims 2-4, 9, 11, 12, 14, 15 and 17-20, dependent on an amended claim, are determined to be patentable.

New claims 21-29 are added and determined to be patentable.

1. [An] *A post-drilling* aqueous production well composition for injection into a production well, comprising:
   water;
   a polymer selected from the group consisting of polymers that are a product of a polymerization reaction comprising one or more monomers selected from the group consisting of 2-acrylamido-2-methylpropanesulfonic acid [, acrylic acid] and acrylamide; and
   a biocide consisting of 3,5-dimethyl-1,3,5-thiadiazinane-2-thione in an amount effective to inhibit bacterial growth *in the composition during use in the well*.

5. The aqueous production well composition of claim 1, wherein the [well stimulation fluid] *aqueous production well composition* has a viscosity substantially the same as a control [well stimulation fluid] *aqueous production well composition* without the biocide.

6. The aqueous production well composition of claim 1, wherein the [well stimulation fluid] *aqueous production well composition* has a viscosity substantially the same as a control [well stimulation fluid] *aqueous production well composition* without the biocide after heating the fluid to a temperature of 180° Fahrenheit for a period of 8 hours.

8. A method for inhibiting bacterial contamination *in a post-drilling process* with an aqueous production well composition for injection into a production well, comprising adding an effective bacterial inhibiting amount of a biocide consisting of 3,5-dimethyl-1,3,5-thiadiazinane-2-thione to the aqueous production well composition; and injecting the aqueous production well composition into the production well;
   wherein the aqueous production well composition comprises a polymer selected from the group consisting of polymers that are a product of a polymerization reaction comprising one or more monomers selected from the group consisting of 2-acrylamido-2- methylpropanesulfonic acid, acrylic acid and acrylamide.

13. The method of claim 8, wherein the aqueous production well composition has a viscosity substantially the same as a control *aqueous* production well composition without the biocide after heating the fluid to a temperature of 180° Fahrenheit for a period of 8 hours.

*21. The method of claim 8, wherein the post drilling process is a process used to clean a wellbore, enlarge channels, or increase pore space.*

*22. The method of claim 8, wherein the post drilling process is a stimulation operation to recover a hydrocarbons in liquid or gaseous form from a subterranean formation.*

*23. The aqueous production well composition of claim 1, wherein the viscosity of the aqueous production well composition is not substantially decreased relative to a control aqueous production well composition without the biocide after heating the fluid to a temperature of 180° Fahrenheit for a period of 8 hours.*

*24. The aqueous production well composition of claim 1, wherein the pre-inversion viscosity of the aqueous production well composition is not more than 1 cPs less than the pre-inversion viscosity of a control aqueous production well composition without the biocide.*

*25. The aqueous production well composition of claim 1, wherein the post-inversion viscosity of the aqueous production well composition is not more than 1 cPs less than the post-inversion viscosity of a control aqueous production well composition without the biocide.*

*26. The method of claim 8, wherein the viscosity of the aqueous production well composition is not substantially decreased relative to a control aqueous production well composition without the biocide after heating the fluid to a temperature of 180° Fahrenheit for a period of 8 hours.*

*27. The method of claim 8, wherein the pre-inversion viscosity of the aqueous production well composition is not more than 1 cPs less than the pre-inversion viscosity of a control aqueous production well composition without the biocide.*

*28. The method of claim 8, wherein the post-inversion viscosity of the aqueous production well composition is not more than 1 cPs less than the post-inversion viscosity of a control aqueous production well composition without the biocide.*

*29. The aqueous production well composition of claim 1, wherein the polymerization reaction further comprises acrylic acid.*

* * * * *